United States Patent [19]
Saho et al.

[11] Patent Number: 5,158,585
[45] Date of Patent: Oct. 27, 1992

[54] COMPRESSOR UNIT AND SEPARATOR THEREFOR

[75] Inventors: Norihide Saho; Takeo Nemoto, both of Ibaraki; Shintaro Sado, Shimizu; Sachihiro Yoshimatsu, Kudamatsu; Tadashi Takada, Kudamatsu; Susumu Harada, Kudamatsu, all of Japan

[73] Assignee: Hitachi, Ltd., Tokyo, Japan

[21] Appl. No.: 657,269

[22] Filed: Feb. 19, 1991

Related U.S. Application Data

[63] Continuation of Ser. No. 336,795, Apr. 12, 1989, abandoned.

[30] Foreign Application Priority Data

Apr. 13, 1988 [JP] Japan ................................. 63-89087
May 20, 1988 [JP] Japan ................................. 63-121788

[51] Int. Cl.⁵ ............................................. B01D 46/00
[52] U.S. Cl. ...................................... 55/338; 55/350; 55/437
[58] Field of Search .................. 55/437-439, 55/350, 338

[56] References Cited

U.S. PATENT DOCUMENTS

| | | | |
|---|---|---|---|
| 3,653,191 | 4/1972 | Nelson et al. ........................ | 55/482 |
| 4,070,166 | 1/1978 | Emanuelsson ....................... | 55/185 |
| 4,144,040 | 3/1979 | Claes et al. .......................... | 55/498 |
| 4,558,573 | 12/1985 | La Monica ........................... | 62/473 |
| 4,645,429 | 2/1987 | Asami et al. ........................ | 417/366 |
| 4,878,923 | 11/1989 | Muller ................................. | 55/350 |

FOREIGN PATENT DOCUMENTS

| | | |
|---|---|---|
| 54-73310 | 12/1979 | Japan . |
| 119452 | 11/1985 | U.S.S.R. ............................... 55/498 |
| 1427707 | 3/1975 | United Kingdom .................. 55/439 |

OTHER PUBLICATIONS

Low Temperature Technology vol. 17 No. 5 (1982 pp. 266-268) Screw Compressor Mayekawa Mfg Ltd.

Primary Examiner—Bernard Nozick
Attorney, Agent, or Firm—Antonelli, Terry, Stout & Kraus

[57] ABSTRACT

A compressor unit in which the oil separated by a plurality of oil separators to a gas suction side pipe of the previous stage oil separator which contains gas whose oil concentration is higher than that of the gas from which oil has been separated, with the separated oil being returned to a compressor. The plurality of separators enables a simplification of the arrangement of the oil returning pipe, a prevention in a reduction in the discharge flow rate of the compressor, and reduction in space required for the separators.

1 Claim, 9 Drawing Sheets

COMPRESSOR UNIT AND SEPARATOR THEREFOR

This application is a continuation of application Ser. No. 336,795 filed Apr. 12, 1989, now abandoned.

BACKGROUND OF THE INVENTION

1. FIELD OF THE INVENTION

The present invention relates to a compressor unit and a separator therefor, and more particularly, to a compressor unit and a separator therefor which enable the arrangement of oil returning pipes to be simplified, and which are capable of eliminating any reduction in the discharge flow rate that might occur when the oil is returned.

2. DESCRIPTION OF THE PRIOR ART

In a conventional compressor unit, e.g., a helium gas compressor unit, oil cooled by a water-cooling or air-cooling type oil cooler is injected into a suction inlet or a hydraulic inlet of a compressor for the purpose of removing the compressive heat generated in the gaseous helium compressed by a compressor. The oil contained in the high pressure gaseous helium discharged from the compressor at a high concentration is therefore separated by a plurality of oil separators which are connected in series by pipes, the individual oil separators separating oil from gaseous helium at different ratios.

The above-described type of compressor unit has been proposed in, for example, the specification of Japanese Patent Publication No. 57-27992.

However, in the conventional techniques, no attention has been paid to any reduction in size of an oil separator. More specifically, a group of oil separators and an adsorber which are divided into individual oil separators and an adsorber are connected in series through pipes. In consequence, the overall size of the group of oil separators is large, and the pipes extend over a considerable distance, increasing the pressure loss. Further, the possibility of gas leaking between the oil separators and the pipes is high, while the number of man-hours required for manufacturing oil separators is increased. The same problems arise with respect to the removal of water content and solids contained in a gas other than gaseous helium and solids contained in the liquid.

In the conventional technique discussed in the passage from page 266 to page 268 of Low-Temperature Technology Vol 17, No. 5(1982), the oil separated by a plurality of oil separators provided on the downstream side of the discharge port of a compressor is returned to the suction side of the compressor through individual oil return pipes. This causes the fluid, e.g., gaseous helium discharged from the compressor to be returned to the low-pressure side together with the oil, greatly reducing the flow rate at which helium is discharged from the outlet of a compressor unit.

SUMMARY OF THE INVENTION

An object of the present invention is to provide a compressor unit which enables any reduction in the discharge flow rate that might occur when oil is returned to be minimized.

Another object of the present invention is to provide a separator and an adsorber for a compressor which enables the size of a group of separators to be reduced so as to alloy the size of a compressor unit to be made more compact and also to reduce the number of man-hours required for manufacture, which enables the amount of gas pressure loss suffered to be reduced, and which is capable of eliminating any risk of leakage of gas to the atmosphere.

In order to achieve the above-described objects, the present invention provides a compressor unit in which the number of oil returning pipes through which the inlet side and the discharge side of a compressor communicate is reduced by reducing the number of oil returning pipes that communicate with the suction side of a compressor and by returning some of oil returning pipes to the inlet side of an oil separator located upstream through a pressure reduction/suction means.

More specifically, the present invention provides a compressor unit including: an oil lubricated type compressor; a plurality of oil separators provided in the discharge side pipe of the compressor; and an oil returning pipe for connecting the interior of the oil separators to a compressor low pressure or intermediate side pipe of the compressor. The compressor unit is characterized in that the oil returning pipes led from the second stage oil separator and the subsequent oil separators, which are provided on the downstream side of the discharge side pipe, are connected with each other through a pressure reduction/suction means or a pressurization-/injection means provided in the suction side pipe of the oil separator disposed at the upstream side of the second stage oil separator and the subsequent stage oil separators by at least one stage. In other words, the oil returning pipes are connected to the compressor discharge side pipe in an area in which the oil concentration of the gas is higher than that of the gas at the inlets of the oil separators from which said oil returning pipes are led out.

Preferably, the oil returning pipes of the individual oil separators are independently connected to the pressure reduction/suction means or the pressurization/injection means without being united to one pipe. Alternatively, the plurality of oil separators are accommodated within one pressure-tight container together with the oil returning pipes and the pressure reduction/suction means.

An ejector or an aspirator may be used as the pressure reduction/suction means for causing the fluid discharged from the compressor to flow to generate suction force.

In the same pressure-tight container, the oil separators may be separated from each other by partitioning walls, each of which has a sealing means and a fluid flow passage. Sealing may also be provided by pressing the pressure-tight container against the sealed surface of each of the partitioning walls.

The pressure reduction/suction means (for example, an oil suction means) such as an ejector provided at the suction side of the oil separators generates reduction in the pressure at its back pressure side and, hence, the suction force by restricting the flow passage of the gaseous helium that flows into the oil separators, by which means the oil separated by the oil separators located on the downstream side is returned to the upstream side. Thus, the oil separated by the oil separators located on the downstream side is collected in the oil separator located on the upstream side, only the oil collected in this oil separator being returned to the compressor suction side pipe. This allows the oil separated by the group of oil separators to be returned to the compressor smoothly. With this arrangement, the number of pipes that bypass the high-pressure side and the suction side of the compressor can be reduced to one, and the amount of gaseous helium that is returned together with the oil can be reduced.

The object of the present invention is also achieved by the provision of a separator which includes a pressure container incorporating a plurality of liquid removing filter walls that divide the interior of the pressure container into a plurality of portions, and a means for introducing a fluid to one end of the group of filters and causing the fluid to flow out of the other end thereof. The separator according to the present invention may also includes, a liquid droplet and vapor removing filter or a removing means such as an adsorbing material, in addition to the above-described components.

More specifically, the separator according to the present invention includes a plurality of pressure containers connected in series each of the pressure containers incorporating a filter, a means for introducing the gas to one end of the filter and a means provided within the pressure container for introducing the gas which has passed through the filter to one end of the filter in other pressure container, and a means for introducing the substance separated by the filters to the outside of the pressure containers.

Preferably, the adsorbing layer for adsorbing impurities may be provided in the filters or subsequent to the filters in at least one stage.

It is also preferable for the contracted portion of the gas flow passage not to be provided between the adjacent filters within one pressure container.

The fluid which is introduced into the pressure container A from one end of a series-connected filters passes through the plurality of filters, by which impurities are removed. A resultant fluid flows out of the pressure container A, and then enters the container pressure B. Alternatively, the resultant fluid flows into the adsorbing material disposed subsequent to the series-connected filters in the pressure container A, and then flows out of the pressure container A as a fluid from which vaporized substance has been removed. In this way, the pipes that connect the group of oil separators with each other or the pipes that connect the group of oil separators with each other and that connect the group of oil separators with the adsorber can be omitted. In consequence, the size of the group of oil separators can be reduced, thereby reducing the size of a resultant compressor unit, the number of man-hours required to manufacture a compressor unit, the gas pressure loss, and the amount of gas that leaks to the atmosphere. In this case, the oil or the like separated by the filters stays in the plurality of spaces formed by the filter walls, and is then discharged to the outside of the pressure container A independently or after it has been gathered at one place. The discharged oil or the like is returned to a compressor.

A "separator" used in this specification is defined as a device which includes an inlet and outlet for gas, a filter provided in the gas flow passage thereof for separating a substance other than gas from the gas, and a means for introducing the separated substance to the outside of the separator.

A "compressor unit" used in this specification is defined as a unit which includes an inlet and an outlet for gas, an oil lubricated type compressor for pressurizing the gas injected thereinto, a separator for separating oil from the gas discharged from the compressor, and a means for returning part or the entirety of the separated oil to the compressor.

In the present invention, the number of oil returning pipes that connect the group of oil separators with the compressor can be reduced to one so as to simplify the arrangement of these pipes. Further, the amount of gas that bypasses through the oil returning pipes can be reduced. In consequence, the pipes within the compressor unit can be made compact, and reduction in the compressor unit discharge flow rate can be avoided.

Further, in the present invention, a plurality of separating filters can be incorporated within a separator, the separated impurities can be retrieved in the spaces formed between the adjacent filters, and the amount of gas that flows back to the compressor through the oil returning pipes can be reduced. Consequently, the size of the separator, the components in the compressor unit and the pipes can be reduced, the reduction in the compressor unit discharge flow rated can be avoided, and the production cost of the separator and the compressor unit can be decreased.

DETAILED DESCRIPTION OF THE PREFERRED EMBODIMENTS

The present invention will now be described in detail with reference to the accompanying drawings.

Figure 1:
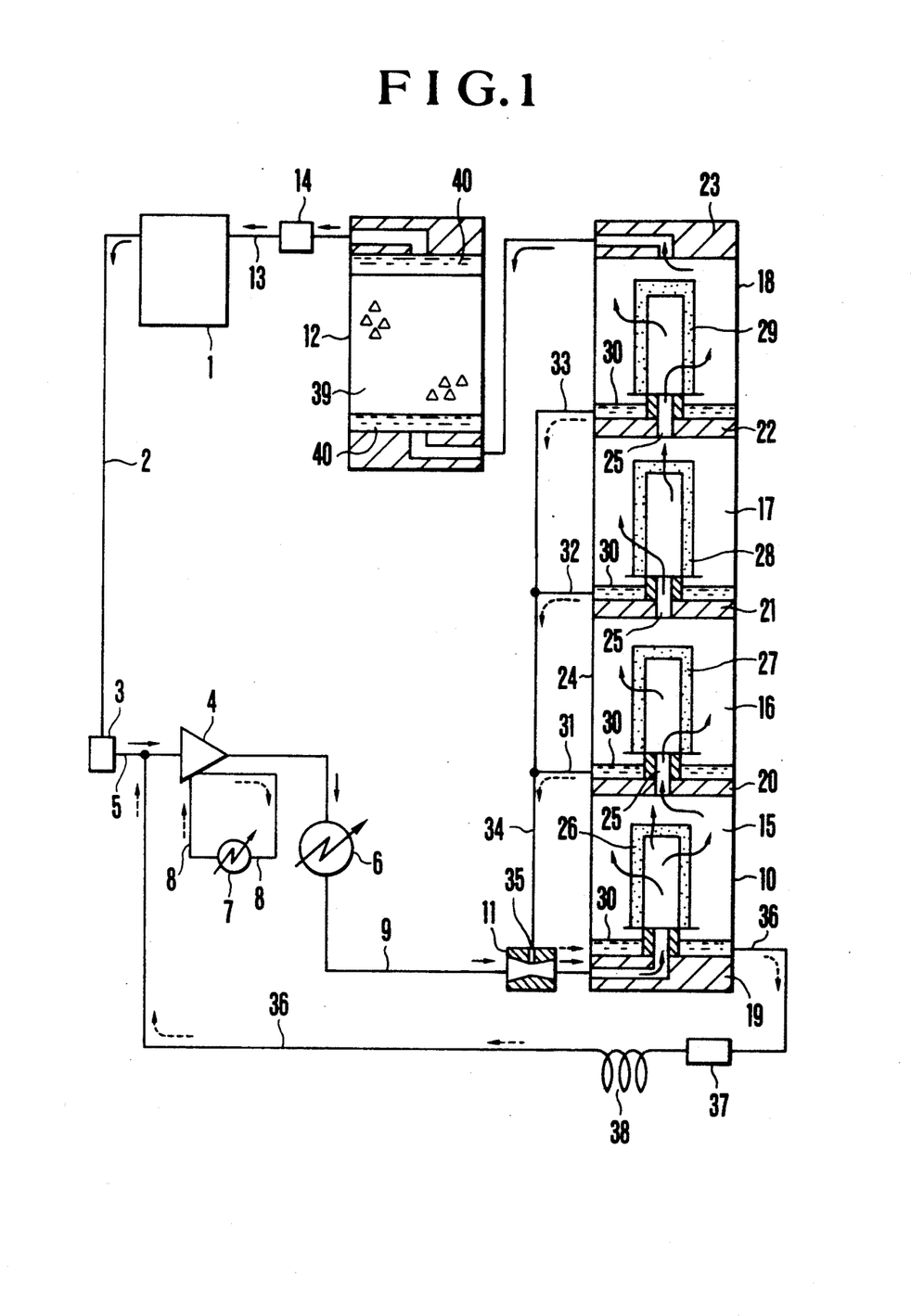
FIGS. 1, 2, 3, 4 and 7 are respectively system diagrams, showing examples of a compressor unit according to the present invention.

A first embodiment will be first described with reference to FIG. 1. A compressor unit, which supplies high pressure gaseous helium to a refrigerating machine, e.g., a helium refrigerating machine, includes a helium refrigerating machine 1, a low-pressure gaseous helium pipe 2, a pipe joint 3, a compressor 4, a suction pipe 5, a gas cooler 6 for cooling the compressed high-temperature gaseous helium, an oil injecting circuit 8 for forcibly injecting the oil cooled by an oil cooler 7 into the compressor 4 utilizing a pressure difference in the gas in order to cool the gaseous helium which is being compressed, a compressor discharge pipe 9, an injector (or an ejector) 11 provided between the compressor discharge pipe 9 and a group of oil separators 10, an oil adsorber 12 disposed downstream of the group of oil separators, a gas supplying pipe 13 for the helium refrigerating machine 1, and a pipe joint 14. The oil separator group 10 consists of four oil separators 15, 16, 17 and 18. The group of oil separators 10 is enclosed by partitioning walls 19 and 23 and a cylinder 24 so that it does not communicate with atmosphere. The individual oil separators are separated from each other by partitioning walls 20, 21 and 22, each of which has a gas introducing port 25.

In the first stage oil separator, an inverted cup-shaped filter element 26 may be provided at a predetermined distance from the inner bottom surface to separate oil. About 90% of oil contained in the gas is removed by this filter element 26. The oil 30 removed stays at the bottom. Similarly, about 90% of oil contained in the gas processed by the previous filter element is removed by a filter element in the subsequent oil separator in the group of oil separators, allowing the concentration of the oil contained in the gas at the outlet of the group of oil separators 10 to be reduced to about 1/10000th of the concentration of the oil at the inlet. The oil 30 separated in each oil separator stays at the bottom thereof. Oil returning pipes 31, 32 and 33 provided at the bottom portions of the second stage oil separator and the subsequent oil separators are united into one pipe 34, which communicates with a back pressure port 35 of the ejector 11. An oil returning pipe 36 provided at the bottom portion of the first stage oil separator communicates with the low-pressure side of the compressor 4, e.g., the suction pipe 5, through a filter 37 and a restricting means such as a capillary tube 38. The oil returning pipe 36 may also be connected to the oil injecting circuit 8, which is on the intermediate pressure side. The restricting means may also be an orifice.

The oil vapor that cannot be separated by the group of oil separators is substantially removed by adsorbing material 39 in the oil adsorber 12 which may be activated carbon, a resultant purified gas being supplied to the helium refrigerating machine 1. A filter 40 is provided on each of the upstream and downstream sides of the oil adsorbing material 39 so as to prevent scattering of fine powder of adsorbing material.

The value representing the difference between the high-pressure and the back pressure in the ejector is made larger than the total amount of values that represent the reduction in pressure in the filters 26, 27 and 28. This allows the oil 30 separated in the second oil separator and the subsequent oil separators to be returned to the inlet of the first oil separator. The oil returned is separated again by the filter 26, and the separated oil returns to the compressor 4 through the oil returning pipe 36. More specifically, the gaseous helium containing oil circulates between the group of oil separators consisting of the second oil separator and the subsequent oil separators and the first stage oil separator through the oil returning pipes 31, 32 and 33 but no gaseous helium returns to the low-pressure side of the compressor 4 from the above-described group of oil separators. In consequence, the reduction in the discharge flow rate in the compressor unit is caused only by the returning of gas through the oil returning pipe 36.

Thus, in the present embodiment, the arrangement of the oil returning pipes in the compressor unit can be simplified, and this prevents reduction in the discharge flow rate in the unit.

Figure 2:
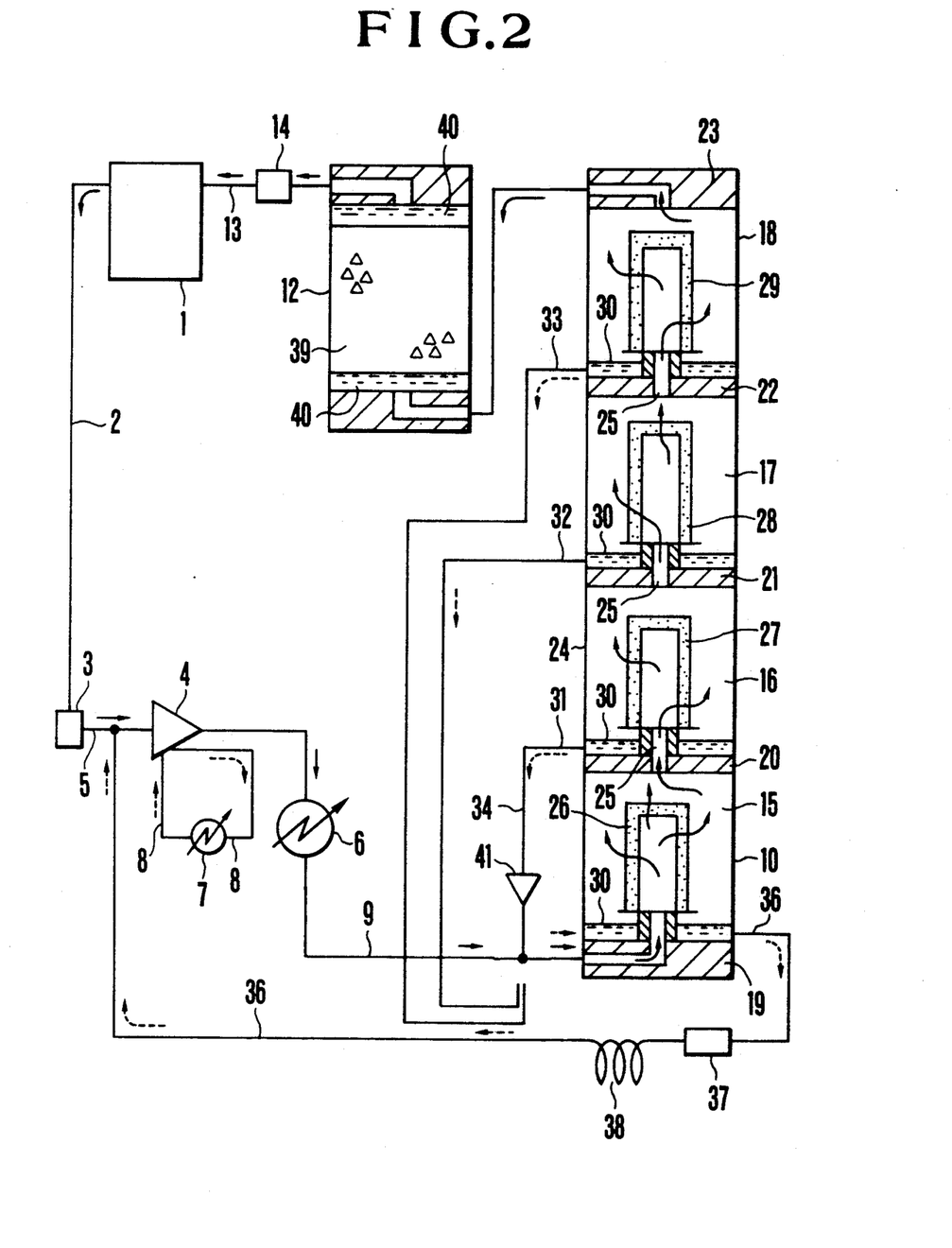

FIG. 2 shows a second embodiment of the present invention. The second embodiment differs from the first embodiment in that a pressurizer 41 such as a gear pump is provided in place of the pressure reducing injector. This enables reduction in the pressure of the gas in the oil returning portion to be eliminated.

Figure 3:
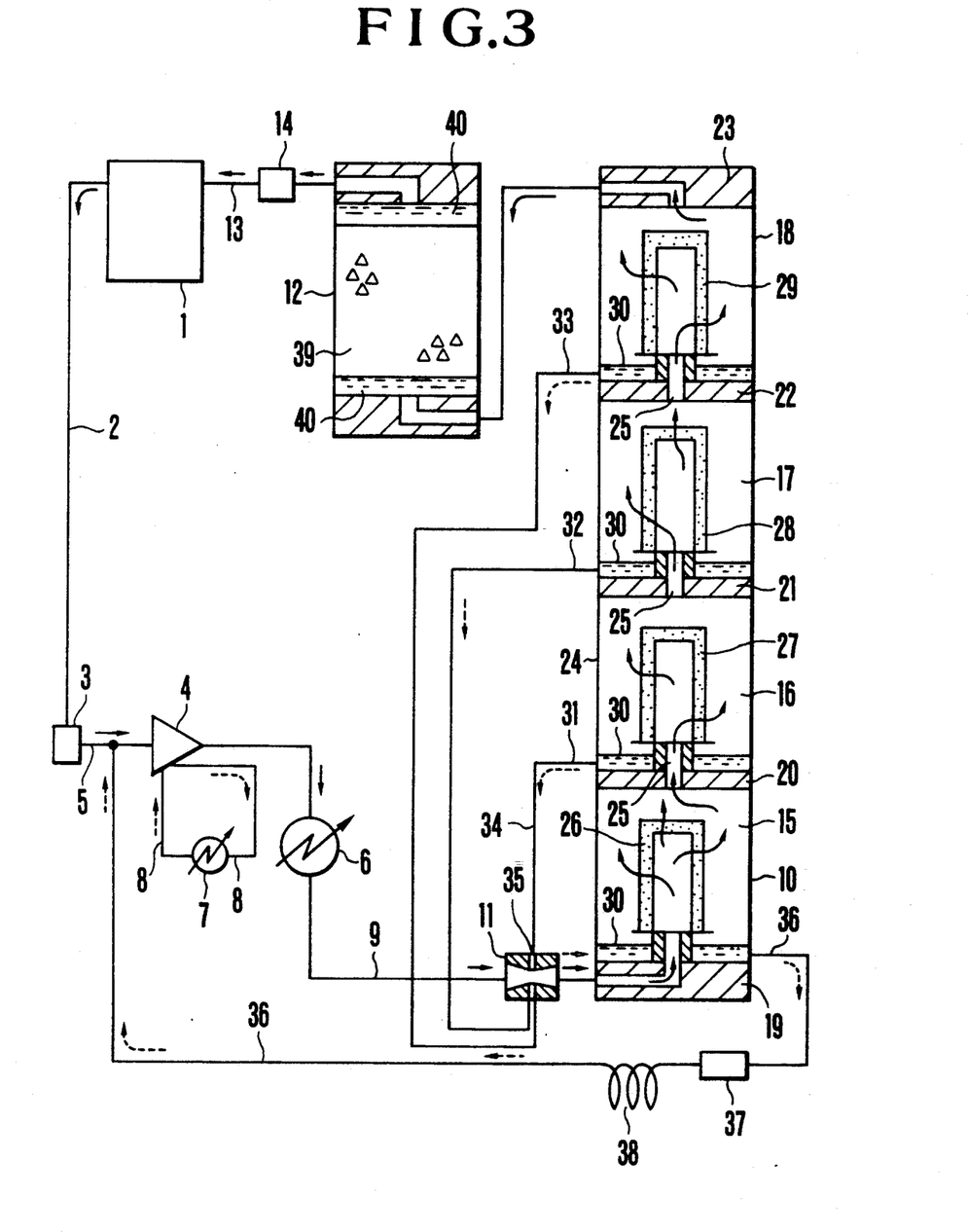

FIG. 3 shows a third embodiment of the present invention. This embodiment differs from the embodiment shown in FIG. 1 in that the oil returning pipes 31, 32 and 33 are not united into one pipe but they are respectively made to communicate with the injector 11. With this modification, even if the filter 28 may be clogged, it is possible to prevent oil from flowing backward from the oil returning pipe 31 to the pipe 33. Further, a dust collecting filter may be provided in each of the oil returning pipes 31, 32 and 33 in order to prevent clogging in the ejector.

Figure 4:
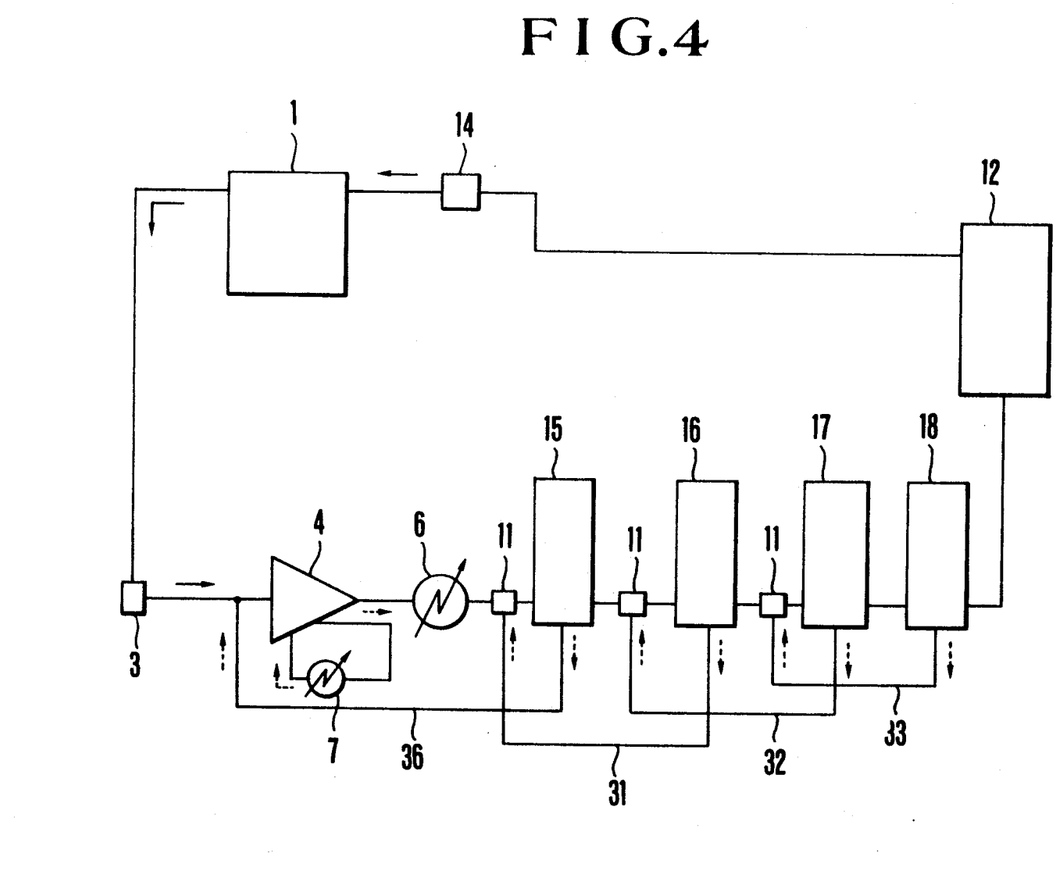

FIG. 4 shows a fourth embodiment of the present invention. In this embodiment, the individual oil separators are disposed independently from each other, and the oil returning pipes 31 to 33 respectively communicate with the injectors provided at the inlet of the oil separator of the immediately previous stage. The independently disposed oil separators also ensures the effect of the present invention.

Figure 5:
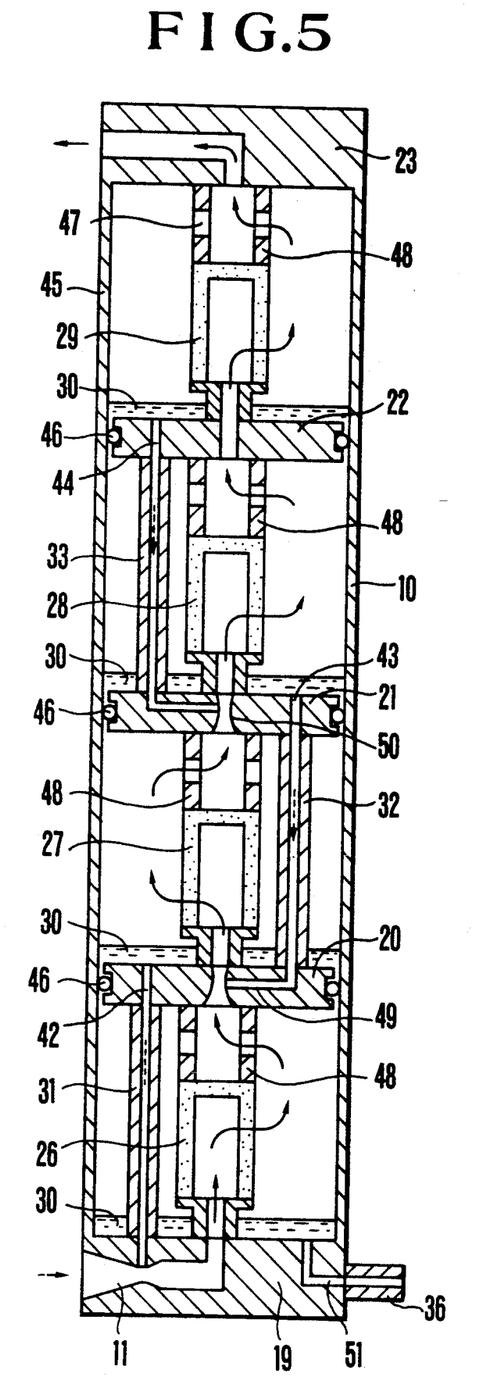
FIGS. 5, 6, 8, 9, 10, 11 and 12 are respectively cross-sectional views, showing examples of a separator according to the present invention.

FIG. 5 shows a fifth embodiment of the present invention. In this embodiment, the oil returning pipes 31, 32 and 33 are made to communicate with the back pressure side of ejectors 11, 49 and 50 provided at the suction side of the oil separators of the immediately previous stage. The oil returning pipes 31, 32 and 33 are incorporated within the corresponding separators. Further, oil returning ports 51, 42, 43 and 44 which are respectively formed in partitioning walls 19, 20, 21 and 22 are connected to the oil returning pipes 36, 31, 32 and 33, and no oil returning port is provided in a shell 45 of the group of oil separators 10. The sealing of each of the partitioning walls 20, 21 and 22 is provided by an O-ring 46, and the above-described arrangement allows the damage to the O-rings to be prevented, which would otherwise occur when it is inserted due to the burr generated during the machining of an oil returning port. Further, a position retaining ring 48 with an air hole formed therein is disposed between the upper portion of each of the filters and the corresponding partitioning wall so that the filter does not vibrate due to the flow of gas.

In the fifth embodiment, since the oil returning pipes are incorporated in the oil separators, the compressor unit can be made compact. Further, the O-rings are used to separate the individual oil separators from each other, and this enables the production cost of the group of oil separators to be reduced. The oil returning pipes 31, 32 and 33 may be a capillary pipe made of copper, such capillary pipes being coiled within the oil separator.

Figure 6:
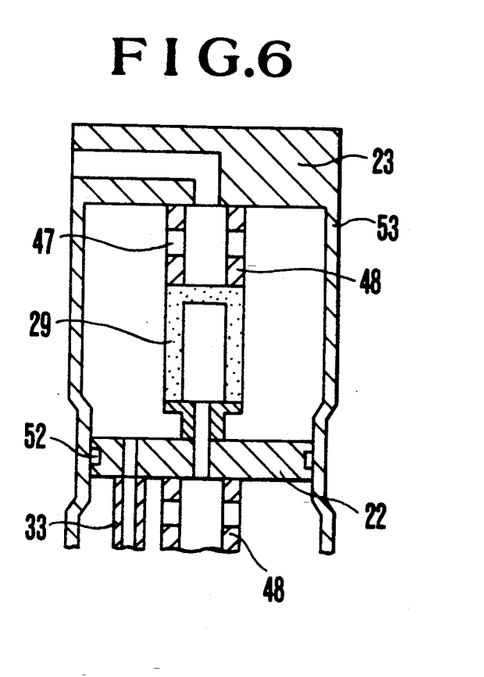

FIG. 6 shows a sixth embodiment of the present invention. In this embodiment, a groove 52 is formed on the outer periphery of each of the partitioning walls 20, 21 and 22 (the partitioning walls 21 and 22 being not shown). The portions of the shell 53 which face the partitioning walls are plastically deformed inwardly so that they are caused to bite into the grooves 52. In this way, air-tightness can be improved and more firm fixing can be ensured as compared with the case in which the sealing is provided by the use of the O-rings. Further, since it is not necessary for the rings 48 to be used to fix the partitioning walls, it is possible to reduce the production cost.

Figure 7:
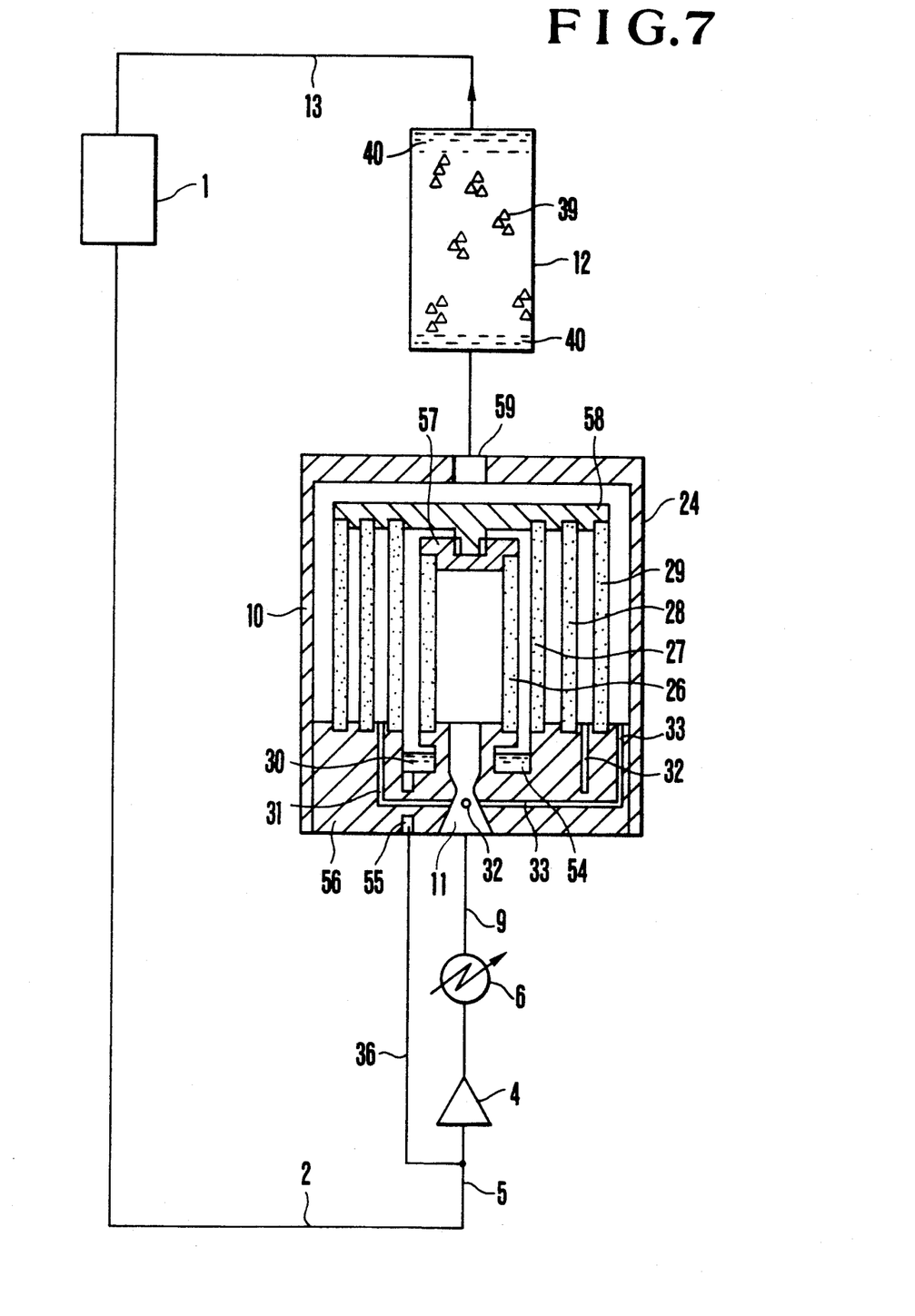

FIG. 7 shows a seventh embodiment of the present invention. In this embodiment, the refrigerant used in a helium refrigerating machine 1 is pressurized by a compressor 4. The compressive heat of the pressurized refrigerant is eliminated by a gas cooler 6. The pressurized refrigerant then flows into an oil separator 10 where liquid impurities, e.g., water or oil, mixed in the refrigerant at the inlet of or within the compressor 4 are removed. Thereafter, oil vapor or the like in the helium gas is adsorbed by an adsorber 12, and resultant high-pressure, purified gaseous helium is supplied to the refrigerating machine 1 where it is used to generate coldness utilizing adiabatic expansion or the like. Low-pressure gaseous helium discharged from the refrigerating machine returns to the compressor 4. The gas that flows into the oil separator 10 passes through an ejector 11 and then flows into a first filter 26. The oil droplets contained in the gas are separated from the gas while the gas is passing through the cylindrical first filter 26 made of, for example, glass fiber, and the separated oil 30 stays in a groove 54 formed at the bottom between the first filter 26 and a second filter 27. The oil in the groove 54 passes through an oil returning port 55, and then returns to the compressor 4 through a pipe 36. The separator 10 also incorporates a third filter 28 and a fourth filter 29. The filters incorporated in the separator 10 are disposed in a concentric fashion. The lower portions of the filters are supported by a flange 56, and the upper portions thereof are supported by holders 57 and 58, which are formed as one unit. The space between the respective filters is sealed by the flange and the holders. As the gas flows outward through the respective filters, the oil contained in the gas is collected by the filters. The separated oil stays at the bottoms of the spaces located outside of the respective filters, and is discharged to the outside of the respective filters through oil drainage pipes 31, 32 and 33.

In this embodiment, the oil drainage pipes 31, 32 and 33 communicate with the back pressure side of the ejector 11 provided at the inlet of the separator 10 so as to allow the separated oil to be returned to the inlet of the first filter utilizing a suction force generated due to the flow of the gas. Alternatively, the individual oil drainage pipes may be connected to the suction side of the compressor 4.

The gas that flows out of the fourth filter contains only oil vapor and oil particles having a diameter of 0.1 $\mu$m or less. The oil content in the gas is adsorbed by an adsorbing material 39 such as activated carbon in the adsorber 12, which communicates with an outlet 59 of the separator. Filters 40 made of, for example, glass fiber are provided at the top and bottom of the adsorbing material 39 in order to prevent fine powder generated from adsorbing material 39 from scattering in the gas.

When the gas flows through the oil separator, it only passes through the cylindrical filters, so the flow passage of the gas does not contract or expand to a large degree between the adjacent filters, unlike the conventional oil separator. This enables the pressure loss caused due to the flow of gas to be minimized.

In the present embodiment, filters are disposed in a concentric fashion within one oil separator, and the oil that stays at the bottom of the space between the adjacent filters is returned to the compressor. In consequence, a small separator which ensures low pressure loss can be made smaller. This means that a compressor unit that incorporates the oil separator of this invention can be made small. Further, the gas pressure loss that occurs in the oil separator can be reduced. Further, since a plurality of filters are accommodated within one container, the provision of a plurality of filter accommodating container portions can be eliminated. This in turn enables provision of the pipes that connect individual containers to be eliminated, reducing the amount of gas that leaks into the atmosphere as well as the number of man-hours required for manufacturing the oil separator.

Figure 8:
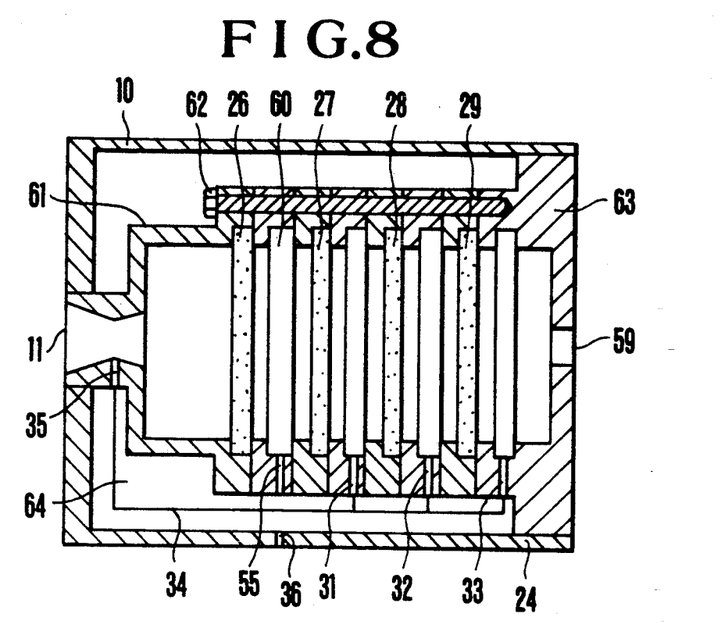

FIG. 8 shows an eighth embodiment of the present invention. The eighth embodiment differs from the embodiment shown in FIG. 7 in that filters having a flat plate-like shape are accommodated in the oil separator. More specifically, flat plate-like filters 26, 27, 28 and 29 are fixed to an outlet flange 63 by an inlet flange 61 and a bolt 62 with spacers 60 being interposed between the adjacent filters. Oil drainage holes 55, 31, 32 and 33 are formed below the spaces formed between the adjacent filters, the oil drainage hole 55 communicating with an inner space 64 in the oil separator 10 and the oil drainage holes 31, 32 and 33 communicating with a back pressure hole 35 of the injector 11 through a pipe 34. The gas that contains a large amount of oil flows into the separator 10 through the injector 11. After the oil has been separated by the filters, the resultant highly purified gas flows out of the separator 10 from an outlet 59. The pressure in the space 64 is set to a lower value than that in the spaces between the adjacent filters due to an oil returning hole 36 being connected to the low-pressure or intermediate-pressure side of the compressor. As a result, the separated oil flows into the space 64 through the oil drainage hole 55, stays at the bottom of the space 64 and returns to the compressor 4 through the oil returning hole 36.

In this embodiment, since the flat plate-like filters form a multi-stage oil separator, the size of the resultant oil separator becomes small. Further, the filters having the same size can be used, and this enables the production cost to be reduced. It is also possible to provide a horizontal type oil separator. Alternatively, the oil drainage holes 31, 32 and 33 may be formed such that they directly communicate with the space 64.

Figure 9:
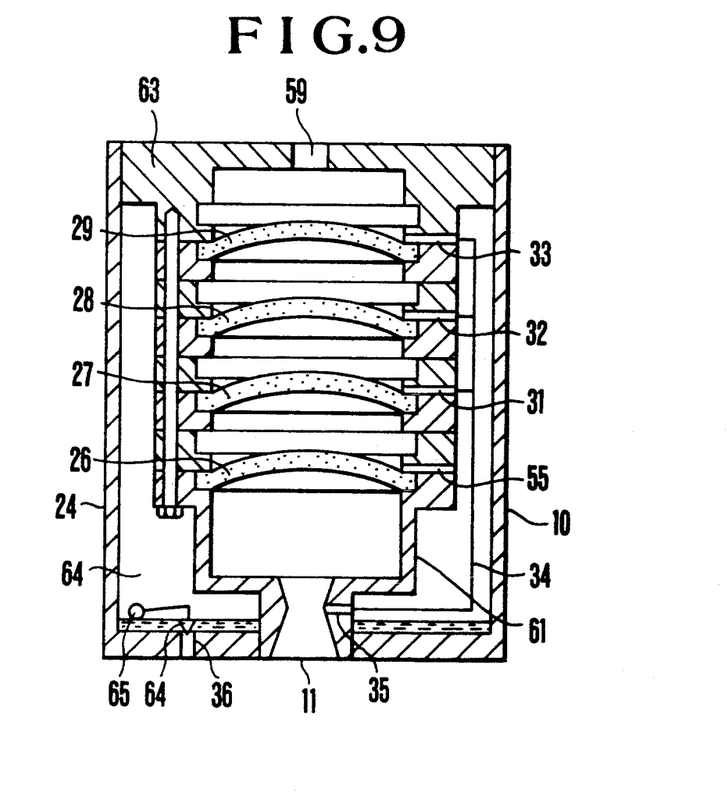

FIG. 9 shows a ninth embodiment of the present invention. This embodiment differs from the embodiment shown in FIG. 8 in that filters 26, 27, 28 and 29 having a flat plate-like shape with the central portion thereof being curved are disposed in the oil separator, and in that the oil returning hole 36 is opened and closed by a flat needle valve body 64 of a float needle valve with a flat 65. In this embodiment, since the central portion of each of the filters is curved, even if an oil separator is disposed vertically, the separated oil moves toward the outer periphery of the filter and does not stay at the central portion, preventing the separated oil droplets from scattering in the gas that passes through the filter and thereby ensuring stable separation. Further, the provision of the float needle valve allows a certain amount of oil that gathers at the bottom of the space 64 to be returned to the compressor. In consequence, bypass of the gas is eliminated, enabling the entire gas discharged from the compressor to be supplied to the refrigerating machine.

Figure 10:
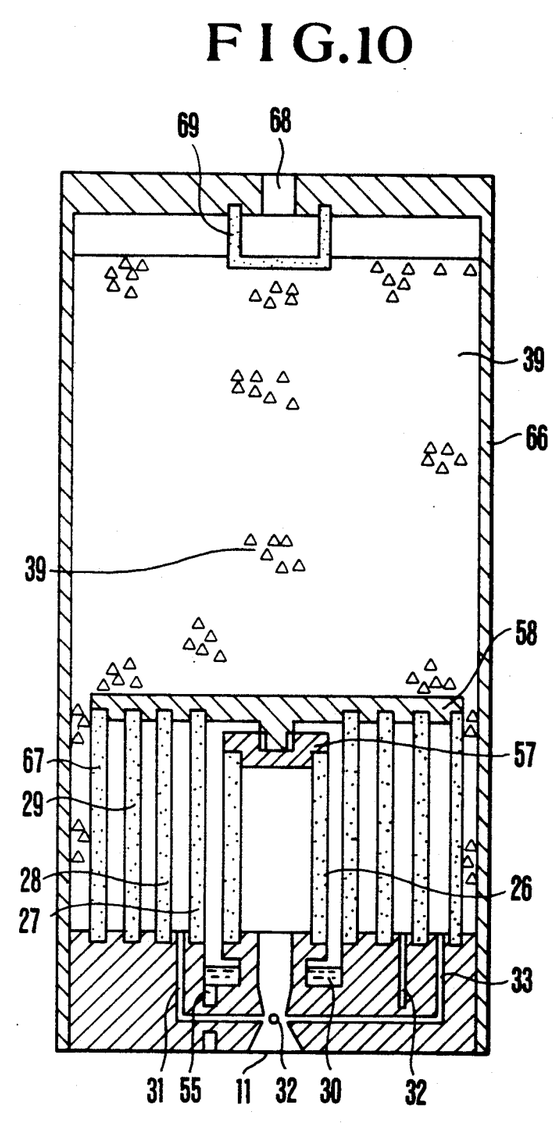

FIG. 10 shows a tenth embodiment of the present invention. In this embodiment, an oil separator 10 having the oil retrieving function and an adsorber 12, which are formed as one unit, are accommodated in a pressure container 66. More specifically, a filter 67 is provided around a filter 29 to prevent the fine powder of the adsorbing material 39 from entering the oil separator, and a filter 69 is provided at a gas outlet 68 to prevent the fine powder of the adsorbing material 39 from scattering in the gas. In this embodiment, since the oil separator and the adsorber are formed as one unit, the size of the compressor unit can be made smaller, and the production cost can be thus reduced. Further, the provision of a pipe that connects the oil separator with the adsorber can be eliminated, and this enables the possibilities of pressure loss and gas leakage to be reduced.

Figure 11:
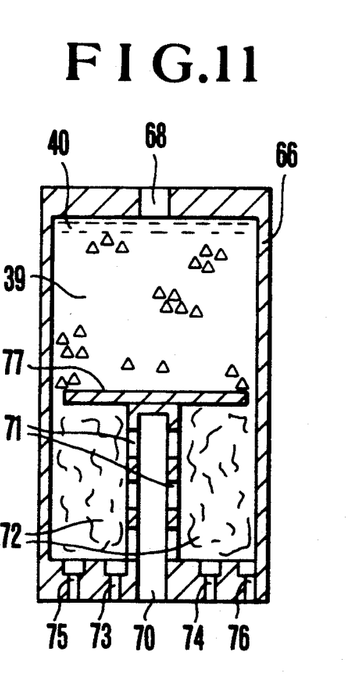

FIG. 11 shows an eleventh embodiment of the present invention. In this embodiment, fiber is filled in the oil separator in place of the oil collecting filters. The gas that flows into the oil separator from an inlet port 70 flows into a fiber 72 through central air holes 71. As it flows in the radial direction, oil is separated by the filter, and the separated oil moves downward along the fiber, is discharged from the oil separator through oil drainage holes 73, 74, 75, and 76, and is retrieved in the compressor. The gas whose oil concentration has been decreased flows into the adsorbing material from around a baffle 77, where oil concentration thereof is further decreased.

In this embodiment, an oil separator is constituted by the glass fiber filled at a high density in place of filters. In consequence, space in which filters are to be disposed is not required, and this enables the size of the resultant compressor unit to be further reduced.

Figure 12:
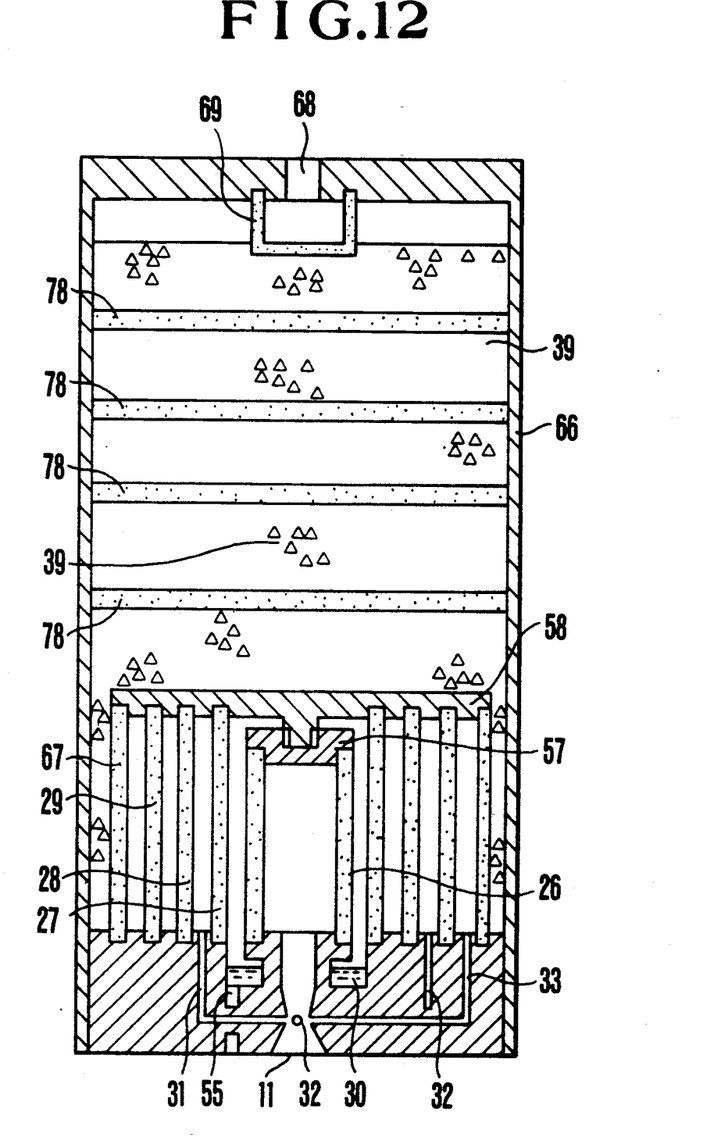

FIG. 12 shows a twelfth embodiment of the present invention. This embodiment differs from the embodiment shown in FIG. 10 in that an adsorbing material 39 is divided into a plurality of portions by water holding members 78 made of, for example, fiber. This allows the amount of adsorbed oil that flows into an adsorbing material whose oil concentration is lower to be reduced. Further, since the fine powder of the adsorbing material is diffused, the possibility of the filter clogging can be reduced. This arrangement can also be applied to the adsorber unit shown in FIG. 7.

The embodiments of the present invention has been described in the above. The present invention may also be exemplified by any combination of the abovedescribed embodiments.

What is claimed is:

1. A compressor unit including: an oil lubricated type compressor; a plurality of oil separators arranged in series at a discharge side of said compressor, each separator including therein an oil pool section in which the separated oil is collected and a gas outlet through which oil separated gas is delivered to a subsequent oil separator; a compressor discharge pipe for connecting the discharge side of said compressor to an inlet of a first of said plurality of oil separators; an oil separator discharge pipe for connecting said outlet of a last of said plurality of oil separators to the suction side of said compressor; and an oil returning pipe for connecting the oil pool section of said first oil separator to a compressor pipe on at least one of a low pressure and intermediate pressure side of the compressor, wherein an oil suction means is provided in said compressor discharge pipe, and the oil pool sections of said oil separator subsequent to said first oil separator are connected to said oil suction means.

* * * * *